(12) United States Patent
Karkus et al.

(10) Patent No.: US 12,397,823 B2
(45) Date of Patent: Aug. 26, 2025

(54) DIFFERENTIABLE AND MODULAR PREDICTION AND PLANNING FOR AUTONOMOUS MACHINES

(71) Applicant: NVIDIA Corporation, Santa Clara, CA (US)

(72) Inventors: Peter Karkus, Zurich (CH); Boris Ivanovic, Mountain View, CA (US); Shie Mannor, Haifa (IL); Marco Pavone, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 200 days.

(21) Appl. No.: 18/318,233

(22) Filed: May 16, 2023

(65) Prior Publication Data

US 2024/0010232 A1    Jan. 11, 2024

Related U.S. Application Data

(60) Provisional application No. 63/359,407, filed on Jul. 8, 2022.

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 50/0097* (2013.01);
(Continued)

(58) Field of Classification Search
CPC .... G06N 3/045; G06N 3/08; G08G 1/096758; G05D 1/0088; G05D 1/0257; B60T 7/22; G01C 21/3415
See application file for complete search history.

(56) References Cited

U.S. PATENT DOCUMENTS

2014/0067206 A1* 3/2014 Pflug .................. B60T 7/22
                                              701/41
2020/0156631 A1* 5/2020 Lin ..................... G05D 1/0257
(Continued)

FOREIGN PATENT DOCUMENTS

CN    105806353 A  *  7/2016   ......... G01C 21/3453
DE    102020207897 A1 * 12/2021  ............ B60W 40/09

OTHER PUBLICATIONS

Waymo. Safety report, 2021.Available at https://waymo.com/safety/safety-report. Retrieved on Jul. 4, 2021.
(Continued)

*Primary Examiner* — Yuri Kan
(74) *Attorney, Agent, or Firm* — Taylor Duma L.L.P.

(57) ABSTRACT

In various examples, a motion planner include an analytical function to predict motion plans for a machine based on predicted trajectories of actors in an environment, where the predictions are differentiable with respect to parameters of a neural network of a motion predictor used to predict the trajectories. The analytical function may be used to determine candidate trajectories for the machine based on a predicted trajectory, to compute cost values for the candidate trajectories, and to select a reference trajectory from the candidate trajectories. For differentiability, a term of the analytical function may correspond to the predicted trajectory. A motion controller may use the reference trajectory to predict a control sequence for the machine using an analytical function trained to generate predictions that are differentiable with respect to at least one parameter of the analytical function used to compute the cost values.

22 Claims, 11 Drawing Sheets

100

(51) Int. Cl.
  B60W 50/00 (2006.01)
  G06N 3/08 (2023.01)
(52) U.S. Cl.
  CPC ....... G06N 3/08 (2013.01); *B60W 2554/4041* (2020.02); *B60W 2554/4045* (2020.02)

(56) References Cited

U.S. PATENT DOCUMENTS

2020/0331476 A1* 10/2020 Chen .................... G05D 1/0088
2022/0340173 A1* 10/2022 Brown ............. G08G 1/096758

OTHER PUBLICATIONS

Argo AI. Developing a self-driving system you can trust, Apr. 2021. Available at https://www.argo.ai/wp-content/uploads/2021/04/AargoSafetyReport.pdf.; 55 pgs.
Jatavallabhula, et al.; "GradSLAM: Dense SLAM Meets Automatic Differentiation"; arXiv:1910.10672, Oct. 23, 2019, 12 pgs.
Bojarski, Mariusz; "End to End Learning for Self-Driving Cars", https://arxiv.org/abs/1604.07316; Apr. 25, 2016, 9 pgs.
Caesar, H., et al.: "NuScenes: A Multimodal Dataset for Autonomous Driving"; https://arxiv.org/abs/1903.11027; May 5, 2020, 16 pgs.
Xu, et al.; "BITS: Bi-Level Imitation for Traffic Simulation," arXiv preprint arXiv:2208.12403, 2022.
Salzmann, et al.; "Trajectron++:Dynamically-feasible Trajectory Forecasting with Heterogeneous Data"; In European Conference on Computer Vision, pp. 683-700, Springer, 2020.
General Motors. Self-Driving Safety Report, 2018. Available at https://www.gm.com/content/dam/company/docs/us/en/gmcom/gmsafetyreport.pdf.; 33 pgs.
Uber Advanced Technologies Group. A principled approach to safety, 2020. Available at https://uber.app.box.com/v/UberATGSafetyReport; 89 pgs.
Motional. Voluntary safety self-assessment, 2021. Available at https://drive.google.com/file/d/1JjfQByU_hWvSfkWzQ8PK2ZOZfVCqQGDB/view; 54 pgs.
Zoox. Safety report vol. 2.0, 2021. Available at https://zoox.com/safety/.
Nvidia. Self-driving safety report, 2021. Available at https://images.nvidia.com/content/self-driving-cars/safety-report/auto-print-self-driving-safety-report-2021-update.pdf; 27 pgs.
Zhou, et al.; "Tracking Objects as Points"; arXiv:2004.01177; 22 pgs.
Weng, et al.; "MTP: Multi-Hypothesis Tracking and Prediction for Reduced Error Propagation"; arXiv:2110.09481; Oct. 18, 2021, 7 pgs.
Weng, et al.; "Whose Track is it anyway? Improving Robustness to Tracking Errors with Affinity-based Trajectory Prediction"; In Conference on Computer Vision and Pattern Recognition, 2022, 10 pgs.
Zeng, et al.; "End-to-End Interpretable Neural Motion Planner"; In Conference on Computer Vision and Pattern Recognition, pp. 8660-8669, 2019.
Casas, et al.; "MP3: A Unified Model to Map, Perceive, Predict and Plan"; In Conference on Computer Vision and Pattern Recognition (CVPR), 2021, 10 pgs.
Karkus, et al.; "Differentiable Algorithm Networks for Composable Robot Learning"; arXiv:1908.11602; May 28, 2019, 12 pgs.
Amos, et al.; "Differentiable MPC for End-to-End Planning and Control"; In Advances in Neural Information Processing Systems, pp. 8299-8310, 2018.
Ivanovic, et al.; "Heterogeneous-Agent Trajectory Forecasting Incorporating Class Uncertainty"; arXiv:2104.12446; Mar. 3, 2022, 15 pgs.
Weng, et al.; "PTP: Parallelized Tracking and Prediction with Graph Neural Networks and Diversity Sampling"; arXiv:2003.07847; Apr. 3, 2021, 8 pgs.
Ivanovic, et al. "Propagating State Uncertainty through Trajectory Forecasting"; arXiv:2110.03267; Jul. 12, 2022, 8 pgs.
Liu, et al.; "Path Planning for Autonomous Vehicles Using Model Predictive Control"; In IEEE Intelligent Vehicles Symposium, Jun. 11-14, 2017; 6 pgs.
Ivanovic, et al.; "MATS: An Interpretable Trajectory Forecasting Representation for Planning and Control"; arXiv:2009.07517; Jan. 14, 2021, 14 pgs.
Chen, et al.; "Reactive Motion Planning with Probabilistic Safety Guarantees"; In Conference on Robot Learning, 2020, 13 pgs.
Schaefer, et al.; "Leveraging Neural Network Gradients within Trajectory Optimization for Proactive Human-Robot Interactions"; arXiv:2012.01027; Dec. 2, 2020; 7 pgs.
Casas, et al.; "The Importance of Prior Knowledge in Precise Multimodal Prediction"; arXiv:2006.02636; Jun. 4, 2020; 10 pgs.
Ivanovic, et al.; "Injecting Planning-Awareness into Prediction and Detection Evaluation"; arXiv:2110.03270; Oct. 7, 2021; 8 pgs.
McAllister, et al.; "Control-Aware Prediction Objectives for Autonomous Driving"; arXiv:2204.13319; Apr. 28, 2022, 8 pgs.
El Sallab, et al.; "Deep Reinforcement Learning Framework for Autonomous Driving"; arXiv:1704.02532; Apr. 8, 2017, 7 pgs.
Jain, et al.; "Autonomy 2.0: Why is Self-Driving Always 5 Years Away?"; arXiv:2107.08142; Aug. 9, 2021, 10 pgs.
Zeng, et al.; "DSDNet: Deep Structured Self-Driving Network"; arXiv:2008.06041; Aug. 13, 2020, 24 pgs.
Cui, et al.; "LookOut: Diverse Multi-Future Prediction and Planning for Self-Driving"; In Proceedings of the IEEE/CVF International Conference on Computer Vision, pp. 16107-16116, 2021; 10 pgs.
Jonschkowski, et al.; "Differentiable Particle Filters: End-to-End Learning with Algorithmic Priors"; arXiv:1805.11122, May 30, 2018, 9 pgs.
Karkus, et al.; "Particle Filter Networks with Application to Visual Localization"; In Proceedings of the Conference on Robot Learning, pp. 169-178, 2018.
Karkus, et al.; "Differentiable SLAM-net: Learning Particle SLAM for Visual Navigation"; In IEEE Conference on Computer Vision and Pattern Recognition, 2021, 11 pgs.
Karkus, et al.; "QMDP-net: Deep Learning for Planning Under Partial Observability"; In Advances in Neural Information Processing Systems, pp. 4697-4707, 2017, 11 pgs.
Gupta, et al.; "Cognitive Mapping and Planning for Visual Navigation"; arXiv:1702.03920; Feb. 7, 2019, 19 pgs.
Okada, et al.; "Path Integral Networks: End-to-End Differentiable Optimal Control"; arXiv:1706.09597; Jun. 29, 2017, 12 pgs.
Pereira, et al.; "MPC-Inspired Neural Network Policies for Sequential Decision Making"; arXiv:1802.05803; Mar. 14, 2018, 10 pgs.
East, et al.; "Infinite-Horizon Differentiable Model Predictive Control"; arXiv:2001.02244; Jan. 7, 2020, 15 pgs.
Tassa, et al.; "Control-Limited Differential Dynamic Programming"; In IEEE International Conference on Robotics and Automation (ICRA), pp. 1168-1175, IEEE, 2014.
LaValle, et al.; "Better Unicycle Models"; In Planning Algorithms, pp. 743-743. Cambridge University Press, 2006, 1 pg.
Bansal, et al.; "ChauffeurNet: Learning to Drive by Imitating the Best and Synthesizing the Worst"; arXiv.1812.03079; Dec. 7, 2018, 20 pgs.
Chen, et al.; "Interactive Multi-Modal Motion Planning with Branch Model Predictive Control"; arXiv:2109.05128; Sep. 18, 2021, 10 pgs.
Chen, et al.; "ScePT: Scene-Consistent, Policy-Based Trajectory Predictions for Planning"; In Conference on Computer Vision and Pattern Recognition, 2022, 10 pgs.
Rudenko, et al.; "Human Motion Trajectory Prediction: A Survey"; arXiv:1905.06113; Dec. 17, 2019, 37 pgs.
Paszke, et al.; "Pytorch: An Imperative Style, High-Performance Deep Learning Library"; In Advances in Neural Information Processing Systems, pp. 8024-8035, 2019.
Bergamini, et al.; "SimNet: Learning Reactive Self-Driving Simulations from Real-World Observations"; arXiv:2105.12332; May 26, 2021, 7 pgs.
Suo, et al.; "TrafficSim: Learning to Simulate Realistic Multi-Agent Behaviors"; In Conference on Computer Vision and Pattern Recognition (SVPR), pp. 10400-10409, 2021.

(56) References Cited

OTHER PUBLICATIONS

Caesar, et al.; "NuPlan: A Closed-Loop ML-Based Planning Benchmark for Autonomous Vehicles"; arXiv:2106.11810; Feb. 4, 2022; 5 pgs.
Rempe, et al.; "Generating Useful Accident-Prone Driving Scenarios via a Learned Traffic Prior"; In Conference on Computer Vision and Pattern Recognition (CVPR), 2022; 11 pgs.
Weber, et al.; "Credit Assignment Techniques in Stochastic Computation Graphs"; arXiv:1901.01761; Jan. 7, 2019, 40 pgs.
Wang, et al.; "DETR3D: 3D Object Detection from Multi-View Images via 3D-to-2D Queries," https://arxiv.org/abs/2110.06922, Oct. 13, 2021, 12 pgs.
Karkus, et al.: "Diffstack: A differentiable and modular control stack for autonomous vehicles, "https://arxiv.org/abs/2212.06437; Dec. 13, 2022, 17 pgs.
Li, et al.; "End-to-End 3D Tracking with Decoupled Queries," In International Conference on Computer Vision (ICCV), 2023, 10 pgs.
Xu, et al.; "How To Train Your Deep Multi-Object Tracker," https://arxiv.org/abs/1906.06618, Apr. 23, 2020, 14 pgs.
Sahoo, et al.; "Backpropagation through Combinatorial Algorithms: Identity with Projection Works," https://arxiv.org/ abs/2205.15213, Mar. 17, 2023, 27 pgs.
Yin, et al.; "Center-Based 3D Object Detection and Tracking," https://arxiv.org/abs/2006.11275; Jan. 6, 2021, 12 pgs.
Lang, et al.; "PointPillars: Fast Encoders for Object Detection from Point Clouds," https://arxiv.org/abs/1812.05784; May 7, 2019, 9 pgs.
Chen, et al.; "FUTR3D: A Unified Sensor Fusion Framework for 3D Detection," https://arxiv.org/abs/2203.10642; Apr. 15, 2023, 13 pgs.

\* cited by examiner

DIFFERENTIABLE AND MODULAR PREDICTION AND PLANNING FOR AUTONOMOUS MACHINES

CROSS-REFERENCE TO RELATED APPLICATIONS

This application claims the benefit of U.S. Provisional Application No. 63/359,407, filed on Jul. 8, 2022, which is hereby incorporated by reference in its entirety.

BACKGROUND

Autonomous machines, such as intelligent robotic systems or autonomous vehicles (AVs), are typically architected using modules, for example, for performing detection, tracking, prediction, planning, and control. Modular architectures may provide a high level of reusability, interpretability, and generalizability. However, modulator architectures may also be prone to compounding errors, information bottlenecks, and integration challenges between modules. To overcome these challenges, AV stacks have been converted into end-to-end neural networks. This approach benefits from the removal of information bottlenecks and performance scaling with increasing dataset sizes. However, reusability, interpretability, and generalizability may be significantly lower compared to modular architectures. Interpretability in particular is critical for debugging and verification, and for providing safety guarantees for safety-critical applications, such as AV, where the safety guarantees may be paramount to reliably formulating safe decisions using an AV stack.

SUMMARY

Embodiments of the present disclosure relate to differentiable and modular prediction and planning for autonomous machines. Systems and methods are disclosed that may be used to implement autonomous driving stacks that have a modular architecture while reducing or eliminating compounding errors, information bottlenecks, and integration challenges between modules.

In contrast to conventional systems, such as those described above, aspects of the present disclosure provide for using an analytical function to predict motion plans for a machine, such as autonomous vehicle, based at least on predicted trajectories of actors or entities in the environment, where the predictions of the motion plans are differentiable with respect to parameters of a neural network used to predict the trajectories. In at least one embodiment, a motion predictor includes the neural network to predict a future trajectory for an agent. A motion planner includes the analytical function to determine candidate trajectories for the machine based at least on the future trajectory, to compute cost values for the candidate trajectories, and to select a reference trajectory from the candidate trajectories. To provide differentiability, a term of the analytical function may correspond to the predicted future trajectory. The reference trajectory may be used by a motion controller to compute a control sequence for the machine using an analytical function trained to generate predictions corresponding to the control sequence, where the predictions are differentiable with respect to at least one parameter of the analytical function used to compute the cost values.

BRIEF DESCRIPTION OF THE DRAWINGS

The present systems and methods for differentiable and modular prediction and planning for autonomous machines are described in detail below with reference to the attached drawing figures, wherein.

DETAILED DESCRIPTION

Figure 1:
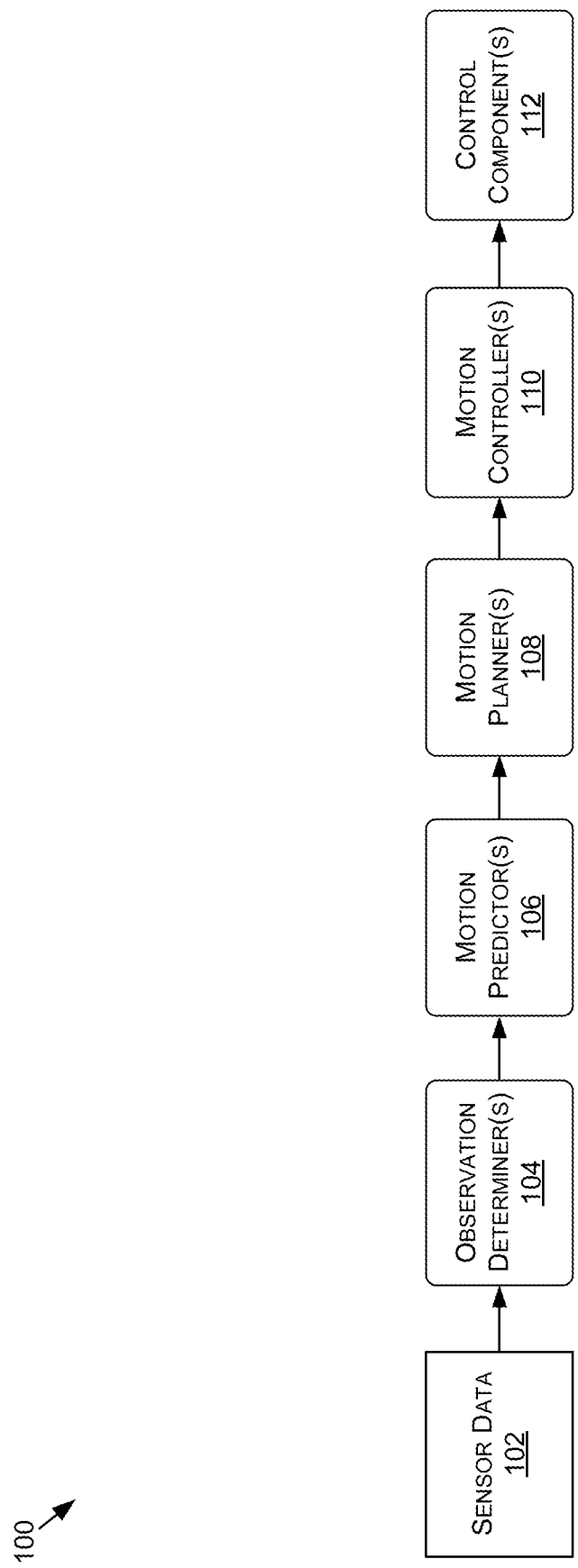
FIG. 1 includes an example data flow diagram for a process for differentiable prediction and planning for autonomous machines, in accordance with some embodiments of the present disclosure.

Systems and methods are disclosed related to differentiable and modular prediction and planning for autonomous machines. Although the present disclosure may be described with respect to an example autonomous vehicle 600 (alternatively referred to herein as "vehicle 600" or "ego-vehicle 600," an example of which is described with respect to FIGS. 6A-6D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to determining control operations for a machine, such as an autonomous vehicle, this is not intended to be limiting, and the systems and methods described herein may be used in augmented reality, virtual reality, mixed reality, robotics, security and surveillance, autonomous or semi-autonomous machine applications, and/or any other technology spaces where evaluations of entity movement may be used.

Aspects of the present disclosure provide for using one or more analytical functions to predict motion plans for a machine, such as autonomous vehicle, based at least on one or more locations of one or more actors or entities in the environment, where the predictions are differentiable with respect to parameters of at least one neural network used to predict the one or more locations. Thus, at least one parameter of the one or more analytical functions may be jointly trained with the parameters of the at least one neural network, allowing gradients to propagate backwards so that upstream predictions are learned with respect to downstream decision making.

In at least one embodiment, a motion predictor includes the at least one neural network to predict a future trajectory of an agent in the environment (e.g., as a probability distribution). A motion planner includes the one or more analytical functions to determine candidate trajectories for the machine based at least on the future trajectory and to compute one or more cost values for the candidate trajectories. To provide differentiability, one or more terms of the one or more analytical functions may correspond to the predicted future trajectory. Further, the motion planner may be trained as a classifier to classify a trajectory as a target, reference, or planned trajectory for the machine. A trajectory that is classified and/or selected as a reference trajectory may be provided to a motion controller to compute a control sequence for the machine to implement the reference trajectory.

In at least one embodiment, the motion controller may compute the control sequence using one or more analytical functions trained to generate predictions corresponding to the control sequence, where the predictions are differentiable with respect to at least one parameter of the one or more analytical functions used to compute the cost values. Thus, at least one parameter of the motion controller may be jointly trained with at least one parameter of the motion planner and the at least one neural network of the motion predictor, allowing for training of the parameters of the components jointly for an overall objective.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 includes an example data flow diagram for a process 100 for differentiable prediction and planning for autonomous machines, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 600 of FIGS. 6A-6D, example computing device 700 of FIG. 7, and/or example data center 800 of FIG. 8.

The process 100 may include generating and/or receiving sensor data 102 generated using one or more sensors. In one or more embodiments, the sensors may include at least one of one or more physical sensors in a physical environment or one or more virtual sensors in a simulated environment. For example, the one or more sensors may correspond to a physical or simulated version of the vehicle 600, as described herein.

The sensor data 102 may include, without limitation, sensor data 102 from any of the sensors of the vehicle 600 (and/or other vehicles or objects, such as robotic devices, VR systems, AR systems, etc., in some examples). For example, and with reference to FIGS. 6A-6C, the sensor data 102 may include data generated by or using, without limitation, global navigation satellite systems (GNSS) sensor(s) 658 (e.g., Global Positioning System sensor(s), differential GPS (DGPS), etc.), RADAR sensor(s) 660, ultrasonic sensor(s) 662, LIDAR sensor(s) 664, inertial measurement unit (IMU) sensor(s) 666 (e.g., accelerometer(s), gyro scope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600 and/or distance traveled), and/or other sensor types.

In some examples, the sensor data 102 may include sensor data generated using one or more forward-facing sensors, side-view sensors, and/or rear-view sensors. This sensor data 102 may be useful for identifying, detecting, classifying, and/or tracking movement of objects around the vehicle 600 within the environment. In embodiments, any number of sensors may be used to incorporate multiple fields of view (e.g., the fields of view of the long-range cameras 698, the forward-facing stereo camera 668, and/or the forward facing wide-view camera 670 of FIG. 6B) and/or sensory fields (e.g., of a LIDAR sensor 664, a RADAR sensor 660, etc.).

The sensor data 102 may include image data representing an image(s), image data representing a video (e.g., snapshots of video), data representing sensory fields of sensors (e.g., depth maps for LIDAR sensors, a value graph for ultrasonic sensors, etc.), and/or data representing measurements of sensors. Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 may be used, at least in part, by an observation determiner 104 to generate one or more observations of one or more entities, such as an ego actor and/or other actors or entities (objects) in an environment. An observation may correspond to one or more states of the environment where a state of the environment may correspond to one or more particular times or time steps. For example, the observation determiner 104 may determine states of actors (e.g., the vehicle 600 and other objects, static or dynamic) in the environment. Additionally, the observation determiner 104 may determine one or more control actions taken by one or more of the actors based at least on one or more states of the actors.

A control action for an actor may include, for example, one or more parameters corresponding to steering and/or acceleration. In at least one embodiment, a control action may include one or more control variables corresponding to a heading rate and/or longitudinal acceleration. The state of each entity or actor may generally include one or more of a location, a speed, a direction or heading (e.g., direction of travel), a velocity, an acceleration(s) (e.g., scalar, rotational, etc.), a pose (e.g., orientation) and/or other information about the state of the actors. As examples, a state may encode or represent the position of an actor in two-dimensional space (e.g., (x, y) coordinates), a unit direction of the actor, and/or a scalar velocity of the actor at a point in time.

In some examples, the state may encode or represent additional or alternative information, such as rotational velocity (e.g., yaw) and/or scalar acceleration in any direction, and/or any other abstract information associated with the entity, such as appearance, category, associated objects, associated intent, status, etc. In at least one embodiment, a distance between states may be measured based at least on a 2D Euclidean distance between the states. In at least one embodiment, a distance between trajectories may be based at least on a root-mean-squared state distance over time.

The observation determiner 104 may determine the state and/or one or more corresponding control actions using any combination of sensors, such as the GNSS sensors 758, the IMU sensor(s) 766, the speed sensor(s) 744, the steering sensor(s) 740, etc. In at least one embodiment, the observation determiner 104 may determine and/or infer the state of the objects in the environment—e.g., other than the vehicle 600—using any combination of the stereo camera(s) 768, the wide-view camera(s) 770, the infrared camera(s) 772, the surround camera(s) 774, the long range and/or mid-range camera(s) 798, the LIDAR sensor(s) 764, the RADAR sensor(s) 760, the microphone(s) 796, the ultrasonic sensor(s) 762, and/or other sensors of the vehicle 600. In some examples, the state of the objects (e.g., when one or more of the objects is another vehicle, or a person using a client device capable of wireless communication) may be determined using wireless communications, such as vehicle-to-vehicle communication, or device-to-vehicle communication, over one or more networks, such as, but not limited to, the network(s) described herein.

In at least one embodiment, the one or more observations of one or more entities, may include one or more characteristics of the environment, for example, to provide context to the states of the entities (e.g., semantic information). Examples of the one or more characteristics include road geometry characteristics, road feature characteristics (e.g., signs, road type, road markings, road conditions, etc.), weather characteristics, visibility characteristics, and/or other extrinsic characteristics which may impact the control action behavior of at least one of the entities. In at least one embodiment, the one or more observations may correspond to one or more driving maneuvers and/or types of driving maneuvers with respect to one or more actors, such as a lane change maneuver, a passing maneuver, a following maneuver, a parking maneuver, etc. In at least one embodiment, one or more of the observations may be assigned and/or associated with one or more scenarios. A scenario may be defined, for example, using one or more parameters indicating one or more environmental characteristics and/or driving maneuvers.

In at least one embodiment, the dynamics of the vehicle 600 and the scene around the vehicle 600 may be modeled using a partially observable Markov decision process (POMDP). The POMDP may be defined using a tuple (S, $\mathcal{O}$, $\mathcal{U}$, f). As described herein, a state space S may include, for example, a state s of the ego agent $s^e$, non-ego agents or entities $s^{ne}$, and other variables or parameters, such as those corresponding to an environment map $s^{ne}$. An observation space $\mathcal{O}$ may refer to the space of observations (e.g., corresponding to the sensor data 102) that the vehicle 600 receives from the observation determiner 104. Further, control input space $\mathcal{U}$ may refer to the space of control inputs u for the vehicle 600 and function $f(s_t | s_{t-1}, u_{t-1})$ may refer to a stochastic state-transition function for time instance or time step t.

In some examples, machine learning models, such as neural networks (e.g., convolutional neural networks), may be used to determine the control actions and/or the states of the actors and/or the environment. For example, sensor data from the sensors of the vehicle 600 may be applied to one or more machine learning models in order to determine the state of the objects and/or the environment. The neural networks may execute on processed and/or unprocessed data for a variety of functions. For example, and without limitation, a convolutional neural network may be used for object detection and identification (e.g., using sensor data from camera(s) of the vehicle 600), a convolutional neural network may be used for distance estimation (e.g., using the sensor data from the camera(s) of the vehicle 600), a convolutional neural network may be used for emergency vehicle detection and identification (e.g., using sensor data from the microphone(s) of the vehicle 600), a convolutional neural network may be used for facial recognition and vehicle owner identification (e.g., using the sensor data from the camera(s) of the vehicle 600), a convolutional neural network may be used for identifying and processing security and/or safety related events, and/or other machine learning models (MLMs) may be used. In examples using convolutional neural networks, any type of convolutional neural networks may be used, including region-based convolutional neural networks (R-CNNs), Fast R-CNNs, and/or other types. In addition to or alternatively from CNNs, any other type of machine learning model may be implemented.

For example and without limitation, any of the various MLMs described herein may include one or more of any type(s) of machine learning model(s), such as a machine learning model using linear regression, logistic regression, decision trees, support vector machines (SVM), Naïve Bayes, k-nearest neighbor (Knn), K means clustering, control barrier functions, random forest, dimensionality reduction algorithms, gradient boosting algorithms, neural networks (e.g., one or more auto-encoders, convolutional, recurrent, perceptrons, Long/Short Term Memory (LSTM), Hopfield, Boltzmann, deep belief, deconvolutional, generative adversarial, liquid state machine, etc. neural networks), and/or other types of machine learning model.

In embodiments where the sensor data 102 corresponds, at least in part, to simulated sensor data, the simulated sensor data may be generated using one or more simulators. For example, the simulated sensor data may correspond to simulation data generated using a simulation application, such as an autonomous vehicle drive simulator (e.g., NVIDIA's DRIVE SIM).

The simulation data may include snapshots, pictures, samples and/or other data about the world state of the simulated or virtual world at each frame. For example, the simulated sensor data may include information about where actors are located in the world, their speeds, accelerations, poses, etc., information about the state of traffic lights or signals, information about the location of traffic signs, stop lines, etc. The world-state may be perceived by the vehicle 600, other vehicles, and/or other systems.

In one or more embodiments, the simulation data may be generated and/or analyzed in light of one or more scenarios, as described herein. For example, one or more scenarios of interest may be hard-coded, or created manually, may be procedurally generated, may be emergent, or otherwise may be manifested within the virtual and/or computational environment. The one or more observations may be determined from simulation data corresponding to the one or more scenarios. For example, one or more scenarios may be assigned to one or more of the observations for use in learning driving behavior for those scenarios.

In at least one embodiment, at least a portion of the observation determiner 104 may be included in a perception component, module, system, and/or block (e.g., of the vehicle 600). For example, the observation determiner 104 may provide one or more outputs of a perception module. In at least one embodiment, the observation determiner 104 may perform object detection and/or tracking to generate observations of an environment.

A motion predictor 106 may use one or more observations and/or states of the environment (e.g., current and/or historical) provided from the observation determiner 104 to determine or generate one or more predicted locations for one or more entities or actors in the environment. For example, the motion predictor 106 may generate data indicating one or more predicted locations for one or more entities for one or more particular times or time steps. For example, the motion predictor 106 may determine one or more predicted trajectories for one or more entities.

Various approaches may be used to implement the motion predictor 106. By way of example, and not limitation, the motion predictor 106 may be implemented using one or more MLMs, such as at least one neural network 310 shown in FIG. 3. The one or more MLMs may be trained to predict data indicating the one or more predicted locations for one or more entities or actors in the environment, such as data representing and/or indicating one or more parameters of one or more future or predicted world-states for one or more particular times or time steps. In at least one embodiment, the one or more MLMs include a graph-structured recurrent neural network the predicts an agent's future position distribution given its past trajectory history and the past trajectories of one or more neighboring agents. In at least one embodiment, the one or more MLMs may use at least one neural network, such as a conditional variational autoencoder (CVAE) to model the potential for multiple future trajectories.

In at least one embodiment, the motion predictor 106 takes H seconds of state history for one or more agents as input, and outputs multimodal trajectory predictions for an agent a∈A in accordance with Equation (1), $$\hat{s}_a^{1-T}(\theta) = \{\hat{s}_{a,k}^{1:T}(\theta)\}_{k \in K} = \text{CVAE}(s_{a' \in A}^{(-H:0)}; \theta), \quad (1)$$

where k∈K is the mode of the output distribution, s refers to a state, and θ refers to training parameters of the motion predictor 106. $\hat{s}_a = \hat{s}_a^{1:T}(\theta)$ may be used herein for brevity. In at least one embodiment, an encoder of the motion planner 108 (e.g., a CVAE) may process agent state histories using recurrent long short-term memory network (LSTM) networks and model inter-agent interactions using graph-based attention. A decoder of the motion planner 108 (e.g., the CVAE) may include a gated recurrent unit (GRU) that outputs a gaussian mixture model (GMM) for each future time step. In at least one embodiment, the GMM modes may correspond to one or more discrete latent states of the motion planner (e.g., the CVAE having K=25 discrete latent states).

In at least one embodiment, to ensure predictions are dynamically feasible, the GMMs may be defined over controls, then integrated through a differentiable dynamics function to produce at least a portion of a trajectory. In at least one embodiment, the input states to the at least one neural network 310 of the motion predictor 106 may use input states that are augmented with one or more variables (e.g., ego-indicator variables), ego states, and/or other state-related information described herein, such as for ego-agent relation reasoning.

Figure 2:
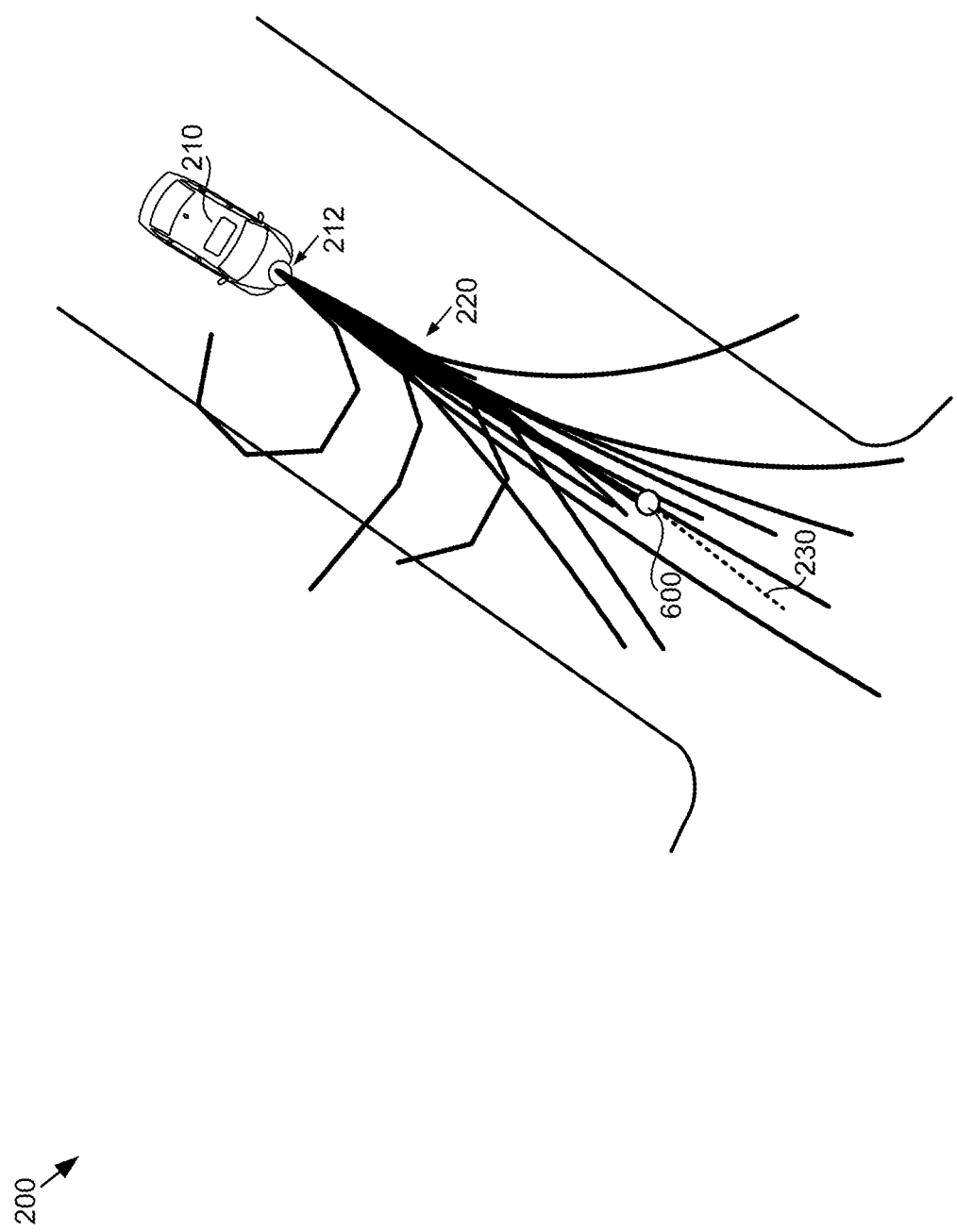
FIG. 2 includes an example illustration of an environment with modes of a predicted location distribution of an agent and a corresponding planned trajectory for a machine, in accordance with some embodiments of the present disclosure.

Referring now to FIG. 2, FIG. 2 includes an example illustration of an environment with modes of a predicted location distribution of an agent and a corresponding planned trajectory for a machine, in accordance with some embodiments of the present disclosure. For example, FIG. 2 shows an environment 200 including an agent 210. FIG. 2 also shows modes 220, which may correspond to the modes of the output distribution described with respect to the motion predictor 106.

A motion planner 108 may use one or more observations and/or observed or predicted states of the environment (e.g., current and/or historical) provided from the observation determiner 104 and/or the motion predictor 106 to determine or generate one or more motion plans for the machine (e.g., the vehicle 600). Each motion plan may indicate one or more potential locations for the machine for one or more particular times or time steps. For example, a motion plan may indicate a potential, reference, and/or planned trajectory for the machine. In at least one embodiment, the motion plan may include a reference or actual trajectory that is to be followed by the machine.

Various approaches may be used to implement the motion planner 108. By way of example, and not limitation, the motion planner 108 may generate or determine one or more (e.g., multiple) candidate movements, such as candidate movements 320 shown in FIG. 3 (e.g., candidate trajectories and/or paths, one or more future locations or maneuvers, etc.). The candidate movement(s) 320 may be generated or determined based at least on one or more of the locations, trajectories, and/or or states of other entities predicted using the motion predictor 106. The motion planner 108 may use the candidate movement(s) 320 to determine (e.g., select) a final, reference, or planned path, trajectory, or movement for the machine, such as reference movement 330 shown in FIG. 3, or reference movement 230 shown in FIG. 2. For example, each path may be generated with multiple time steps or stamps (e.g., 0, 1, 2, and 3) and the individual time steps for each path and/or the paths as a whole may be given a weight or score, with the final value for each path being used in selecting a final path from the paths.

In at least one embodiment, the motion planner 108 uses the observation(s), predicted motion, and/or the sensor data 102 to generate one or more proposed paths for the vehicle 600. For example, the motion planner 108 may generate any number of paths for the vehicle 600, and the proposed paths may be analyzed—e.g., in view of safety or collision avoidance considerations, comfort considerations, consistency considerations, power/gas consumption considerations, conforming to rules of the road, etc.—to determine which path to select as the actual or reference path/trajectory of the vehicle 600. A motion controller 110 may follow the selected reference trajectory while avoiding collision with other agents on the road, ensuring comfort, and satisfying the dynamical constraints of the vehicle 600.

In at least one embodiment, the motion planner 108 generates a set of N dynamically feasible candidate trajectories for the machine, $P=\{s_n, u_n\}_{n \in N}$, and selects a reference or planned trajectory based at least on one or more corresponding cost values (e.g., selects a lowest cost trajectory). For example, a reference trajectory may be selected in accordance with Equation (2):

$$s_{plan}, u_{plan} = \underset{s_n, u_n \in P}{\arg\min} C(s_n, u_n, \hat{s}_{a \in A}, g, m, \omega), \quad (2)$$

where C refers to a cost function, $\hat{s}_{a \in A}$ refer to multimodel predictions for one or more agents from the motion predictor 106, g refers to a given goal, and m refers to a lane graph.

In at least one embodiment, motion planner 108 computes one or more cost values for one or more candidate movements 320 for the machine using one or more analytical functions. The one or more analytical functions may include at least one parameter trained to generate predictions corresponding to the one or more cost values, where the predictions are differentiable with respect to parameters of the at least one neural network 310 of the motion predictor 106.

In at least one embodiment, the motion planner 108 may sample a state space to determine the one or more candidate movements 320 for the machine based at least on a state of the machine (e.g., a current or initial state). The one or more candidate movements may then be filtered based at least on control constraints associated with the machine. For example, to generate candidate trajectories, the motion planner 108 may sample a set of terminal states and generate the trajectories using a current state of the machine and the set of terminal states. In at least one embodiment, the motion planner 108 fits a spline (e.g., a cubic spline) from the current state to a terminal state to generate a candidate trajectory. Dynamically infeasible trajectories may be filtered and/or rejected from consideration of being a reference trajectory or movement for use by the motion controller 110.

In at least one embodiment, the motion planner 108 uses the lane graph m to generate the candidate movement(s) 320. The lane graph m may, for example, represent lanes that are available to the vehicle 600 on a route (e.g., a road). For example, lanes may be modeled as directed edges in a graph. Each edge in the lane graph may correspond to a specific lane segment, and the nodes in the graph may represent lane endpoints or intersections. Each lane segment may be assigned various attributes, such as its position, width, and speed limit, as well as any traffic signs or road markings that may be present. Additionally, the lane graph may include information about traffic flow and congestion, which may be used for planning and control. The lane graph may be used by the motion planner 108 to filter and/or limit considered lanes to and/or determine lanes that are within a threshold distance (e.g., 4.5 m) from the goal g, where a heading difference between the lane and an ego goal state is less than a threshold amount (e.g., 90 degrees).

In at least one embodiment, for each lane that is considered, the motion planner 108 may generate a set of terminal states based at least on a distance traveled along the lane for a set of fixed acceleration values, such as, by way of example, and not limitation $a \in \{-3, -2, -1, -0.5, 0, 0.5, 1, 2\}$m/s$^2$ with lateral lane offsets $\ell_\perp$ in $\{-0.5, 0, 0.5\}$m. The motion planner 108 may then fit a cubic spline from the current state to the terminal state that minimizes mean control effort and may drop the dynamically infeasible trajectories given the control limits of the vehicle 600.

As described herein, the cost function of the motion planner 108 may include one or more analytical functions. As the functions are analytical, they are highly interpretable, and can be configured to provide various safety guarantees to the motion plan. The cost function may incorporate any of a variety of factors. For example, the cost function may be formulated to produce one or more cost values that are based at least on one or more of one or more predicted collisions between the machine and at least one agent of the one or more agents, one or more distances between at least one state of the machine and at least one goal state for the machine, one or more lateral lane deviation amounts, one or more lane heading deviation amounts, or one or more control effort amounts. In at least one embodiment, the cost function may include a momentum-shaped spatial distance to other agents function, a time-to-collision cost function (e.g., computed assuming agents continue moving at a constant speed in their current heading), a speed limit cost function, a distance to a reference trajectory cost function, an ego comfort cost function, and/or a reversing cost function that penalizes the vehicle from going against the heading direction of the current lane.

As described herein, the individual time steps for a path (or trajectories) and/or the paths as a whole may be given a score, with the final value for each path being used in selecting a final, references, or planned path from the paths. For example, in at least one embodiment, a score may correspond to the cost function C, which may include a weighted sum of x handcrafted terms having weights $\omega_x$, a non-limiting example of which may correspond to Equation (3):

$$C(\bullet;\omega) = \omega_1 C_{coll}(s, \hat{s}_{a \in A}) + \omega_2 C_g(s,g) + \omega_3 C_{\ell\perp}(s,m) + \omega_4 C_{\ell_4}(s,m) + \omega_5 C_u(u) \quad (3)$$

where the terms penalize collisions, distance to the goal, lateral lane deviation, lane heading deviation, and control effort, respectively.

In at least one embodiment, the one or more analytical functions include one or more terms that compute a cost corresponding to the location of the agent predicted using the at least one neural network 310 of the motion predictor 106. For example, the collision term $C_{coll}$ may incorporate one or more predictions of the at least one neural network 310. In at least one embodiment, the collision term corresponds to equation (4):

$$C_{coll}(s, \hat{s}_{a \in A}) = \Sigma_{a \in A} \Sigma_{t \in T} \varphi(\Sigma_{k \in K} \pi_k \| s^{(t)} - \hat{s}_{a,k}^{(t)} \|^2). \quad (4)$$

where $\hat{s}_{a,k}$ refers to the k-th mode of the predicted trajectory distribution for agent a, $\pi_k$ refers to the probability for the k-th mode, $\varphi$ refers to a Gaussian radial basis function, and $\|\bullet\|$ refers to a Euclidean norm.

As described herein, the one or more analytical functions used to compute cost values may be trained to generate predictions that are differentiable with respect to parameters of the at least one neural network 310 of the motion predictor 106 (e.g., parameters trained to predict locations and/or states of actors). Thus, the motion planner 108 may be trained jointly with the motion predictor 106. Various approaches may be used to provide a differentiable motion planner 108. In at least one embodiment, the motion planner 108 may classify a trajectory or movement as a target, reference, or planned trajectory or movement for the machine based at least on a categorical distribution corresponding to the one or more candidate trajectories or movements being evaluated. For example, the arm min operation in Equation (2) may be relaxed into sampling from a categorical distribution, while the motion planner 108 functions as a classifier.

Figure 3:
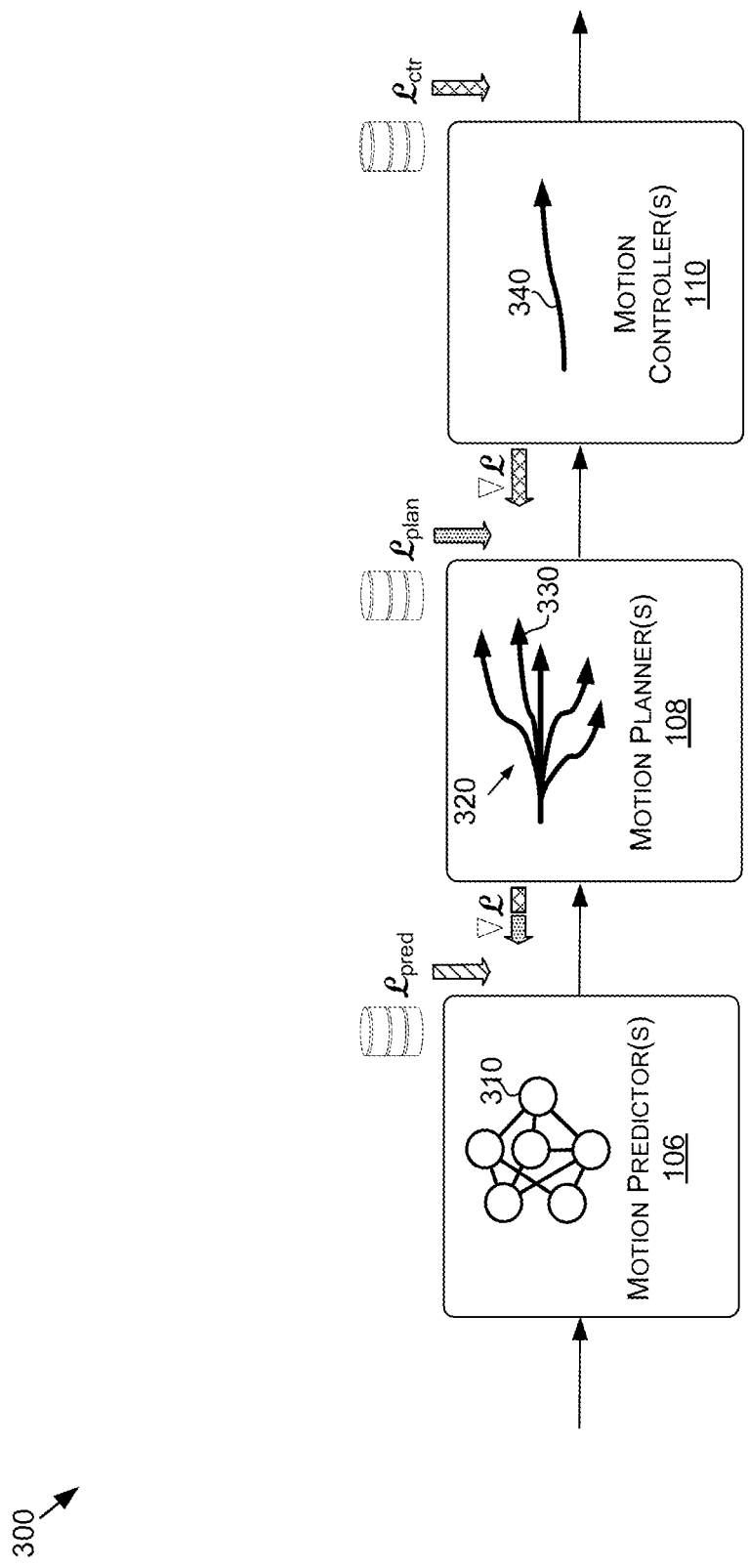
FIG. 3 includes an example data flow diagram for a process for training a system for differentiable prediction and planning for autonomous machines, in accordance with some embodiments of the present disclosure.

Referring now to FIG. 3, FIG. 3 includes an example data flow diagram for a process 300 for training a system for differentiable prediction and planning for autonomous machines, in accordance with some embodiments of the present disclosure. In the example of FIG. 3, the motion predictor 106, the motion planner 108, and the motion controller 110 may be jointly trained using the process 300. The raw prediction training objective for the motion predictor 106 may be $\mathcal{L}_{pred} = \mathcal{L}_{loss}(\hat{s}, \hat{s}_a^{gt})$, where the loss function may, for example, include an information maximizing variational autoencoder (InfoVAE) loss function. The raw prediction training objective for the motion planner 108 may be $\mathcal{L}_{plan} = \mathcal{L}_{CE} = -\Sigma_{n \in N} \mathbb{1}(s_n = s^*) \log p_n$, where the loss function may, for example, include a cross entropy loss function and $s^*$ refers to a target movement or trajectory. The cross entropy loss function may be used to effectively treat the motion planner 108 as a classifier during training, where the probability $p_n$ may be defined in accordance with Equation (5):

$$p_n = \exp(-\beta C(s_n, u_n; \bullet; \omega))/Z, \quad (5)$$

where $\beta$ refers to a temperature parameter, and Z refers to a normalization constant.

Using the chain rule, the gradient with respect to the cost function C and the motion predictor 106 parameters, $\theta$, may be defined in accordance with the Equation (6):

$$\frac{\delta \mathcal{L}_{plan}}{\delta \omega} = \frac{\delta \mathcal{L}_{CE}}{\delta p_n} \frac{\delta p_n}{\delta C} \frac{\delta C}{\delta \omega}, \text{ and}$$

$$\frac{\delta \mathcal{L}_{plan}}{\delta \theta} = \frac{\delta \mathcal{L}_{CE}}{\delta p_n} \frac{\delta p_n}{\delta C} \frac{\delta C}{\delta C_{coll}} \frac{\delta C_{coll}}{\hat{s}_a} \frac{\hat{s}_a}{\theta}, \quad (6)$$

where all terms exist.

The motion controller 110 may follow the selected reference movement 330 while avoiding collision with other agents on the road, ensuring comfort, and satisfying the dynamical constraints of the vehicle 600. In at least one embodiment, the motion controller 110 uses the reference movement 330 to compute a control sequence 340 for the machine (e.g., a continuous and smooth ego-trajectory) using one or more analytical functions trained to generate predictions corresponding to the control sequence, the predictions being differentiable with respect to at least one parameter of the one or more analytical functions used by the motion planner 108 to compute the one or more cost values.

In at least one embodiment, the motion controller 110 performs model predictive control (MPC) over a finite horizon using an iterative box-constrained linear quadratic regulator (LQR) algorithm. In at least one embodiment, the motion controller 110 is implemented in accordance with Equation (7):

$$s_{ctr}, u_{ctr} = \arg\min_{s,u} C(s,u; \hat{s}_{a \in A}, g, m; \omega) \text{ s. } t. \ s^{(0)} = s^{init}, s^{(t+1)} = f_d(s^{(t)}, u^{(t)}), \underline{u} \le u \le \overline{u}, \quad (7)$$

where C refers to the cost function, $f_d$ refers to the dynamics, $s^{init}$ refers to the current or initial machine state, and $\underline{u}$ and $\overline{u}$ refer to control limits. The cost function C may be the same or different than the cost function used by the motion planner 108. A dynamically extended unicycle model may be used for the dynamics $f_d$. The trajectory may be initialized with $u_{plan}$ from the motion planner 108. The motion controller 110 may iteratively form and solve a quadratic LQR approximation of Equation (7) around the current solution $s^{(i)}$, $u_{(i)}$ for each iteration i, using first-and second-order Taylor approximations of the dynamics $f_d$ and the cost function C, respectively. The trajectory may be updated to be close to the LQR optimal control while also decreasing the original non-quadradic cost. The iterations may be terminated based at least on reaching convergence and/or a threshold limit.

In at least one embodiment, the algorithm used by the motion controller 110 is not differentiable with respect to objectives of the motion planner 108 and/or the motion predictor 106 or is implemented using at least one neural network in addition to or instead of the one or more analytical functions. By using one or more analytical functions, the algorithm is highly interpretable, and can be configured to provide various safety guarantees to the control sequence. Further, by being differentiable with respect to objectives of the motion planner 108 and the motion predictor 106, the motion controller 110, the motion planner 108, and the motion predictor 106 may be jointly trained, which may result in enhanced performance. For example, as indicated in FIG. 3, the gradients can propagate backwards from the output of the motion controller 110 to the motion predictor 106, allowing upstream predictions to be learned with respect to downstream decision making. In other words, the process 300 may include computing $$\frac{\delta \mathcal{L}_j}{\delta \theta_i},$$

the gradient of the training objective $\mathcal{L}_j$ of the downstream component j, with respect to the parameters $\theta_i$ of the upstream module I for training the parameters of the components jointly for an overall objective with a gradient-based optimizer.

Various approaches may be used to provide a differentiable motion controller 110. In at least one embodiment, so that the motion controller 110 is differentiable, the control sequence trajectory, $s_{ctr}$, may be differentiated with respect to the dynamics $f_d$ and the cost function C based at least on differentiating underlying Karush-Kuhn-Tucker (KKT) conditions of the last LQR approximation. The gradients maybe analytically computed using one or more additional backward passes of a modified iterative LQR solver. Gradients may not be propagated if iLQR fails to converge.

The gradients may be computed with respect to the cost parameters of the motion planner 108, in accordance with Equation (8):

$$\frac{\delta \mathcal{L}_{ctr}}{\delta \omega} = \frac{\delta \mathcal{L}_{ctr}}{\delta s_{ctr}} \frac{\delta s_{ctr}}{\delta C} \frac{\delta C}{\delta \omega}, \quad (8)$$

and further with respect to the parameters θ of the motion predictor 106, in accordance with Equation (9):

$$\frac{\delta \mathcal{L}_{ctr}}{\delta \theta} = \frac{\delta \mathcal{L}_{ctr}}{\delta s_{ctr}} \frac{\delta s_{ctr}}{\delta C} \frac{\delta C}{\delta C_{coll}} \frac{\delta C_{coll}}{\hat{s}_a} \frac{\hat{s}_a}{\theta}, \quad (9)$$

where $\mathcal{L}_{ctr}$ refers to the control loss.

Various approaches may be used to train the motion predictor 106, the motion planner 108, and the motion controller 110. In at least one embodiment, open-loop training may be performed using human driving data, such as reinforcement learning (RL) or imitation learning (IL). For RL, the process 300 may aim to minimize the hindsight cost $C_H$ of output ego trajectories $s_{ctr}, u_{ctr}$ over training examples in the dataset, $\mathcal{L}_{ctr} = \mathcal{L}_{HC} = C_H(s_{ctr}, u_{ctr}; s_{a \in A}{}^{gt}, g, m; \omega)$. The hindsight cost $C_H$ may capture the quality of the trajectory after knowing the future trajectory of non-ego agents or entities $s_{a \in A}{}^{gt}$. In at least one embodiment, the hindsight cost $C_H$ is identical to the control function C used by the motion planner 108, but with ground truth future trajectory inputs rather than predictions, and with fixed ω parameters. In at least one embodiment, the loss for the motion predictor 106 may correspond to observed future trajectories. Further, the loss for the motion planner 108 may correspond to the candidate moment 330 that has the lowest hindsight cost.

For IL, the process 300 may aim to minimize the mean squared error (MSE) between the output ego trajectory and the ground truth in the dataset, $\mathcal{L}_{ctr} = \mathcal{L}_{IL} = \Sigma_{t=1:T} \|s_{ctr}{}^{(t)} - s^{gt,(t)}\|^2$. The target for the motion planner 108 may be $s^{gt}$ and the total loss for training may be a linear combination of component-wise objectives, $\mathcal{L} = \alpha_1 \mathcal{L}_{pred} + \alpha_2 \mathcal{L}_{plan} + \alpha_3 \mathcal{L}_{ctr}$.

Referring again to FIG. 2, a scenario is presented in which the agent 210 is traveling behind the vehicle 600. Conventional approaches may incorrectly predict the agent 210 will collide with the vehicle 600 from behind with a high probability, causing the vehicle 600 to move into the intersection, which may be dangerous. In contrast, disclosed approach may assign a higher probability to the agent 210 slowing down, resulting in the vehicle 600 slowing down prior to entering the intersection. Thus, the predictions made using the process 100 may be more realistic and accurate, resulting in more reasonable downstream plans.

The motion controller(s) 110 of an autonomous driving software stack may pass information indicating one or more control operations (e.g., corresponding to the control sequence 340) to a control component(s) 112 of the autonomous driving software stack, and the control component(s) 112 may determine controls for the vehicle 600 for actuating the vehicle 600 according to the control operations. One or more portions of the process 100 may be completed as needed, such as at each time instance, interval, and/or for each state of the environment, or when a new motion plan or control sequence is needed or desired, such that new control operations and/or controls are generated, analyzed, and selected, and the vehicle 600 follows the control operations along the way.

Figure 4:
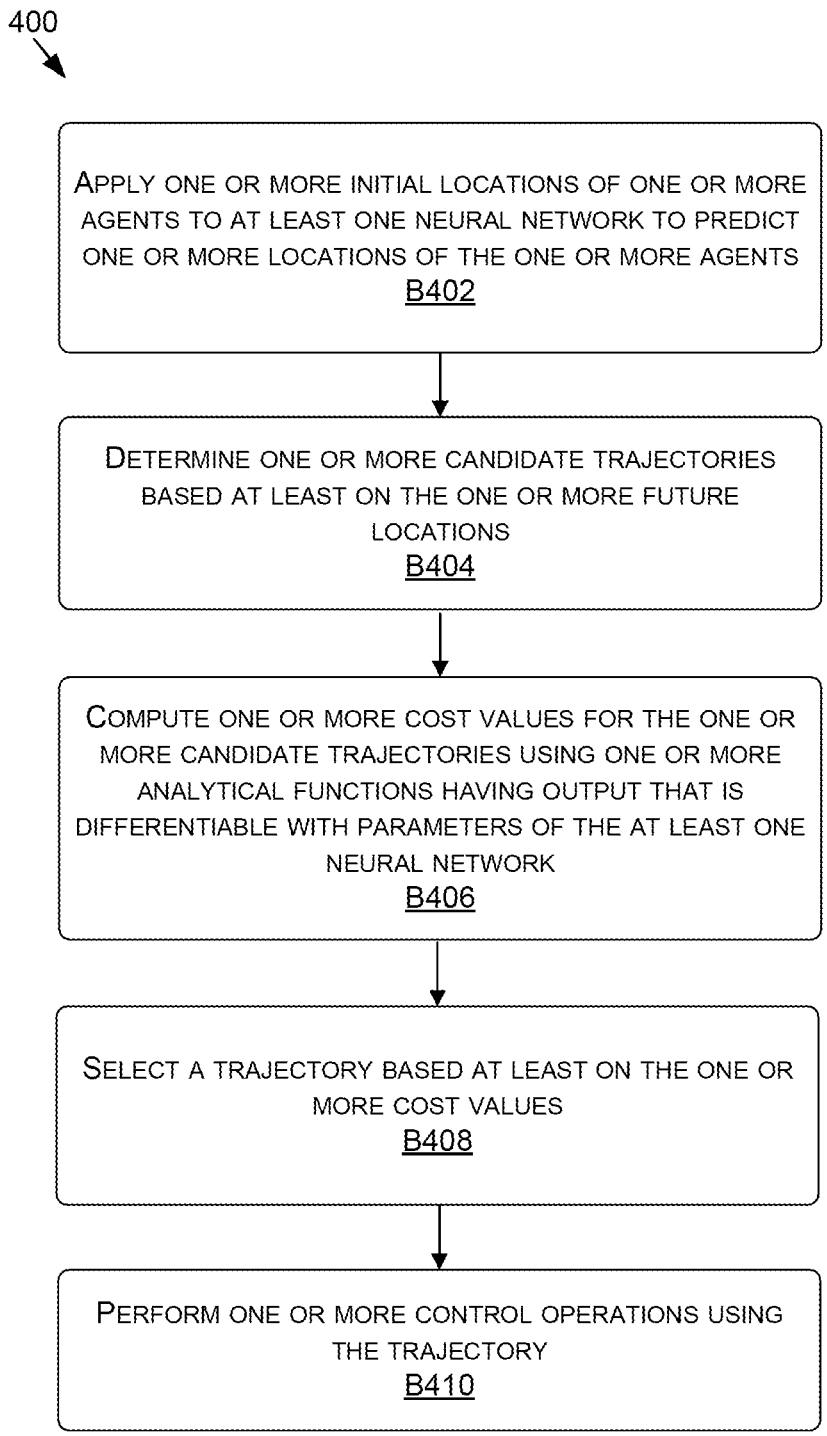
FIG. 4 is a flow diagram showing a method for differentiable prediction and planning using candidate trajectories, in accordance with some embodiments of the present disclosure.
Figure 5:
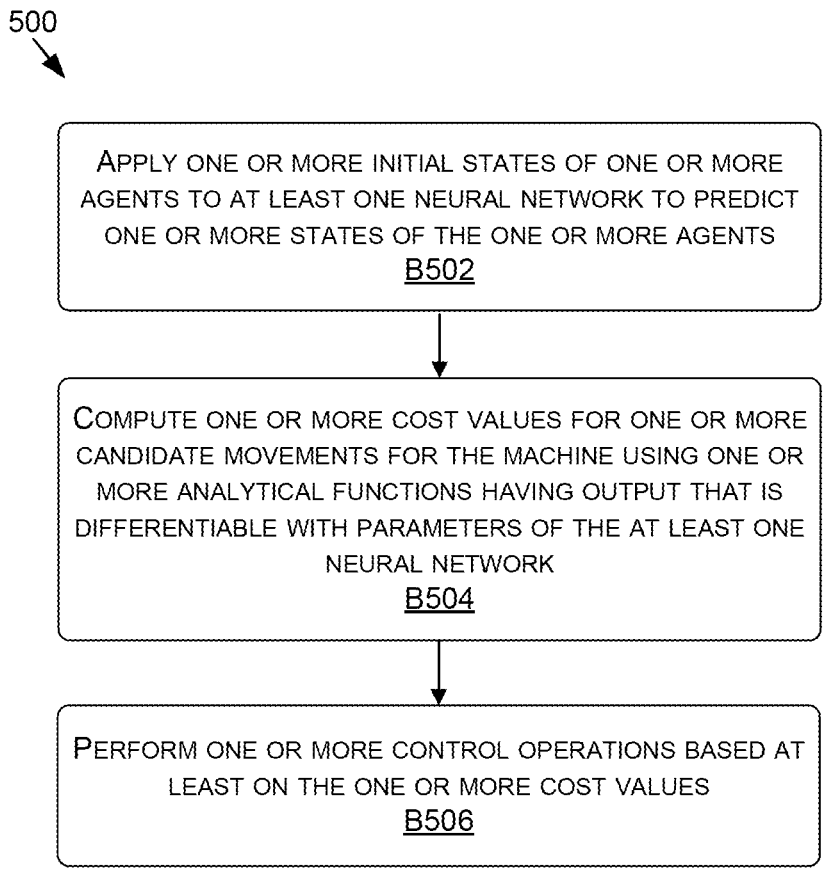
FIG. 5 is a flow diagram showing a method for differentiable prediction and planning using candidate movements, in accordance with some embodiments of the present disclosure.

Referring now to FIGS. 4 and 5, each block of methods 400 and 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to FIGS. 1-3. However, these methods may additionally or alternatively be executed by any one system, or any combination of systems, including, but not limited to, those described herein.

Referring now to FIG. 4, FIG. 4 is a flow diagram showing a method 400 for differentiable prediction and planning using candidate trajectories, in accordance with some embodiments of the present disclosure. The method 400, at block B402, includes applying one or more initial locations of one or more agents to at least one neural network to predict one or more locations of the one or more agents. For example, the motion predictor 106 may apply, to the neural network(s) 310 having parameters trained to predict a future location of the agent 210 in the environment 200, one or more initial locations 212 of the agent 210 determined using the sensor data 102 generated using one or more sensors associated with the vehicle 600.

At block B404, the method 400 includes determining one or more candidate trajectories based at least on the one or more locations. For example, the motion planner 108 may determine the candidate movements 320 for the vehicle 600 based at least on the future location of the agent 210 in the environment 200.

At block B406, the method 400 includes computing one or more cost values for the one or more candidate trajectories using one or more analytical functions having output that is differentiable with parameters of the at least one neural network. For example, the motion planner 108 may compute cost values for the candidate movements 320 using one or more analytical functions (e.g., in accordance with Equation (3)) trained to generate predictions corresponding to the cost values, where the predictions are differentiable with respect to the parameters of the neural network 310.

At block B408, the method 400 includes selecting a trajectory based at least on the one or more cost values. For example, the motion planner 108 may select the reference movement 330 from the candidate movements 320 based at least on the cost values.

At block B410, the method 400 includes performing one or more control operations for the machine using the trajectory. For example, the motion controller 110 may determine the control sequence 340 from the reference movement 330 and the control component 112 may perform one or more control operations for the vehicle 600 using the control sequence 340.

Referring now to FIG. 5, FIG. 5 is a flow diagram showing a method 500 for differentiable prediction and planning using candidate movements, in accordance with some embodiments of the present disclosure. The method 500, at block B502, includes applying one or more initial states of one or more agents to at least one neural network to predict one or more states of the one or more agents. For example, the motion predictor 106 may apply, to the at least one neural network 310 having parameters trained to generate first predictions corresponding to one or more states of one or more agents in the environment 200, one or more initial states of the one or more agents determined using the sensor data 102 generated using one or more sensors associated with the vehicle 600.

At block B504, the method 500 includes computing one or more cost values for one or more candidate movements using one or more analytical functions having output that is differentiable with parameters of the at least one neural network. For example, the motion planner 108 may compute cost values for the candidate movement(s) 320 using one or more analytical functions (e.g., in accordance with Equation (3)) trained to generate second predictions corresponding to the cost values, where the second predictions are differentiable with respect to the parameters of the neural network 310.

At block B506, the method 500 includes performing one or more control operations based at least on the one or more cost values. For example, the control component 112 may perform one or more control operations for the vehicle 600 based at least on the one or more cost values.

Example Autonomous Vehicle

Figure 6A:
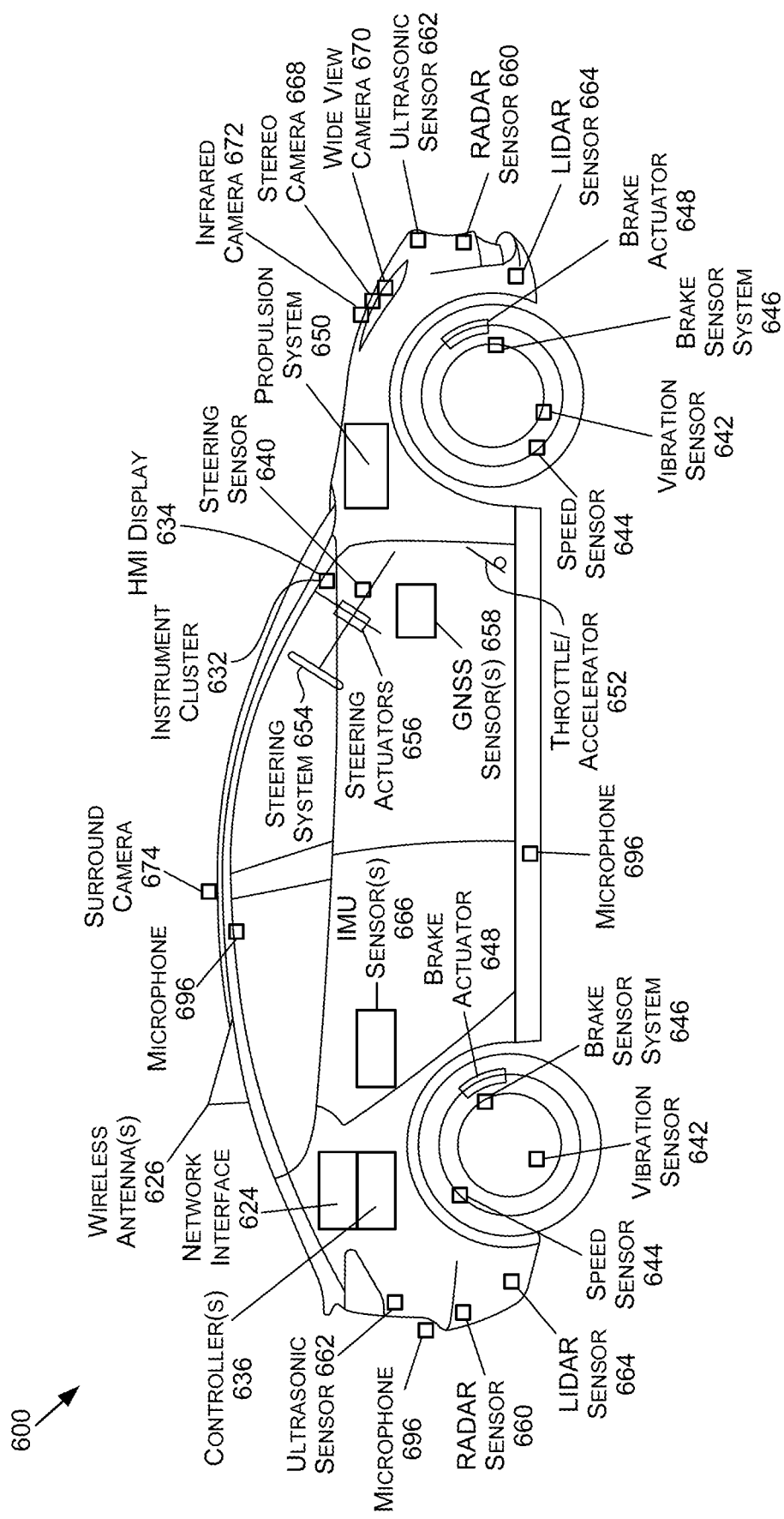
FIG. 6A is an illustration of an example autonomous vehicle, in accordance with some embodiments of the present disclosure.

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3-Level 5 of the autonomous driving levels. The vehicle 600 may be capable of functionality in accordance with one or more of Level 1-Level 5 of the autonomous driving levels. For example, the vehicle 600 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 600 or other machine, such as being fully autonomous, being highly autonomous, being conditionally autonomous, being partially autonomous, providing assistive autonomy, being semi-autonomous, being primarily autonomous, or other designation.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems ("GNSS") sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the High Definition ("HD") map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 626 and/or modem(s) to communicate over one or more networks. For example, the network interface 624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 626 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 6B:
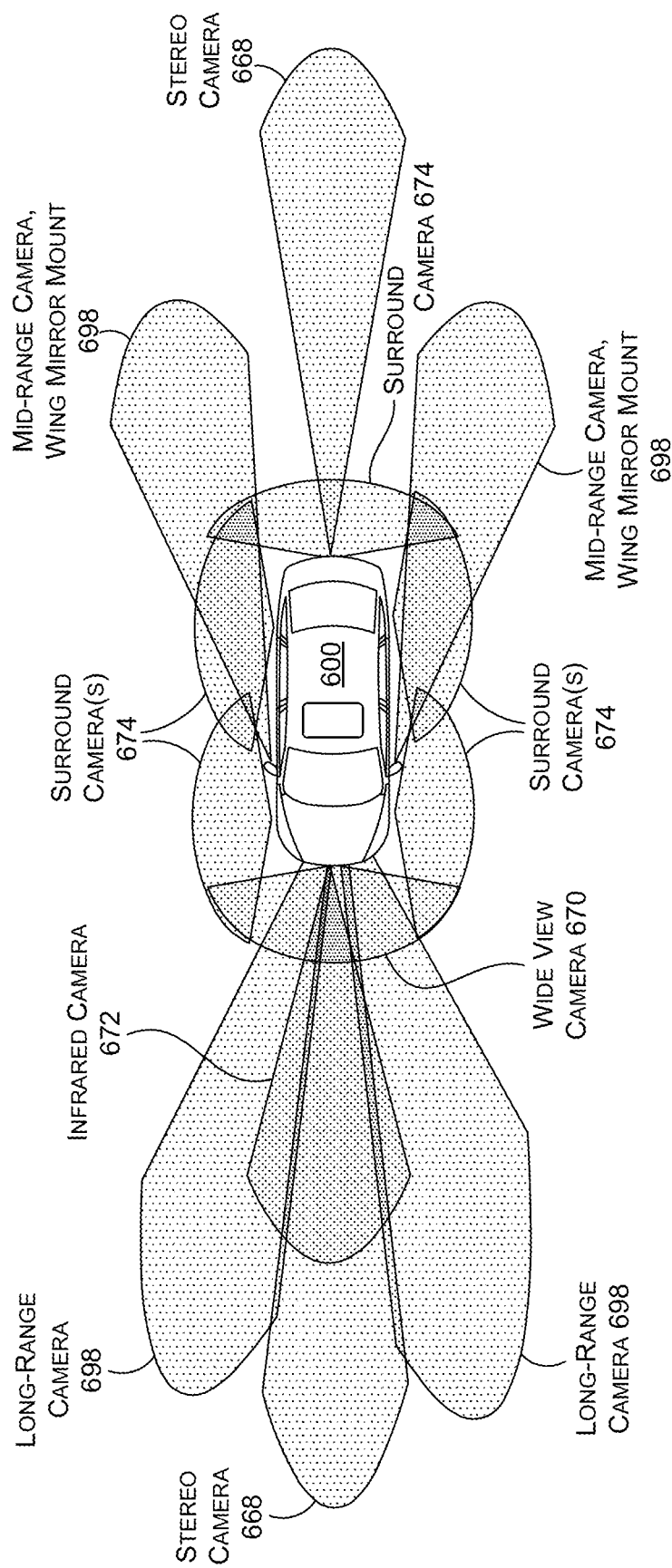
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may be any number (including zero) of wide-view cameras 670 on the vehicle 600. In addition, any number of long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

Any number of stereo cameras 668 may also be included in a front-facing configuration. In at least one embodiment, one or more of stereo camera(s) 668 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
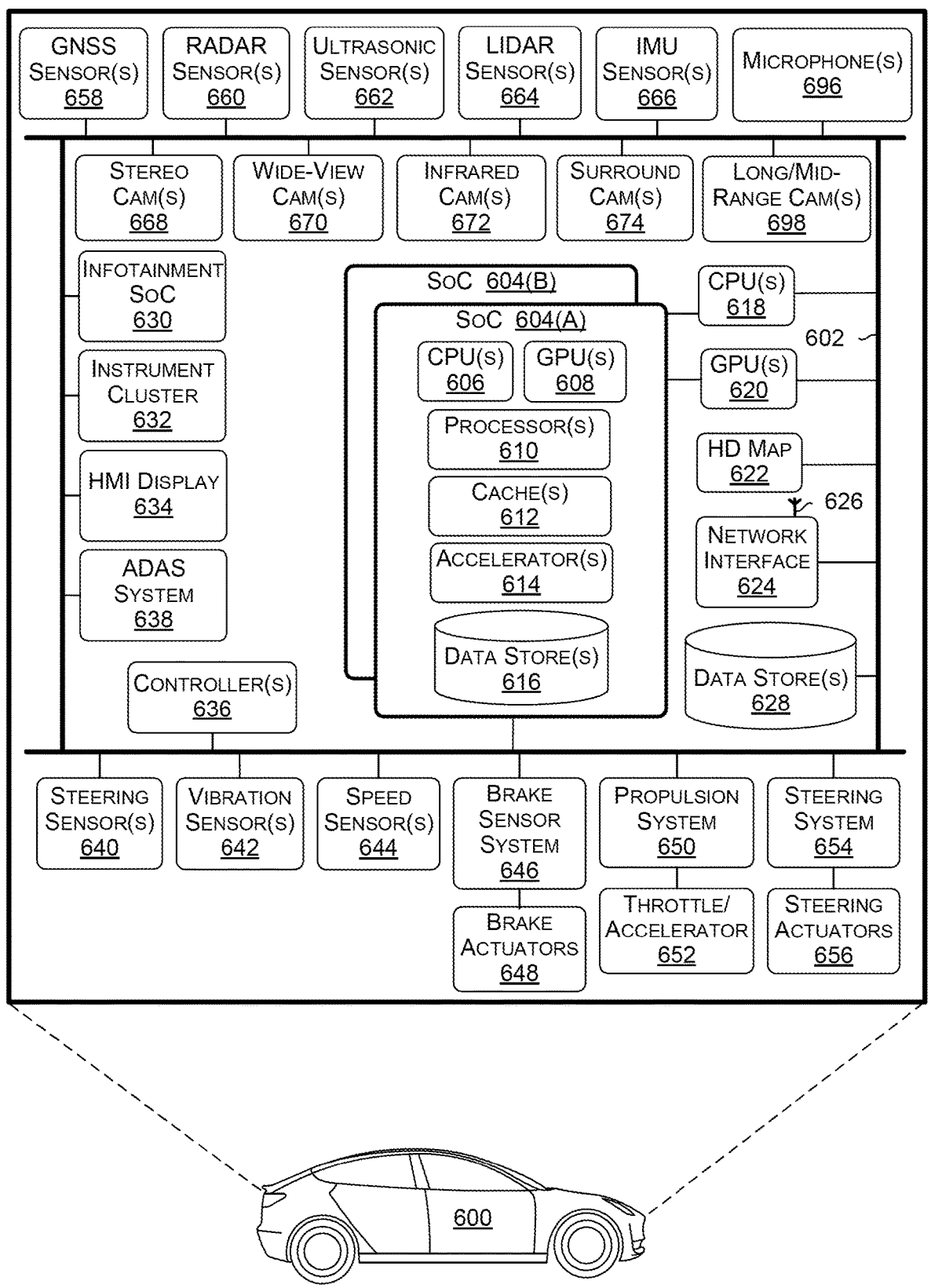
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))—or other math coprocessor or numeric coprocessor types—for performing mathematical operations within the system. For example, the SoC(s) 604 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626

(e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPS (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 600 m, with an accuracy of 2 cm-3 cm, and with support for a 600 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 120-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
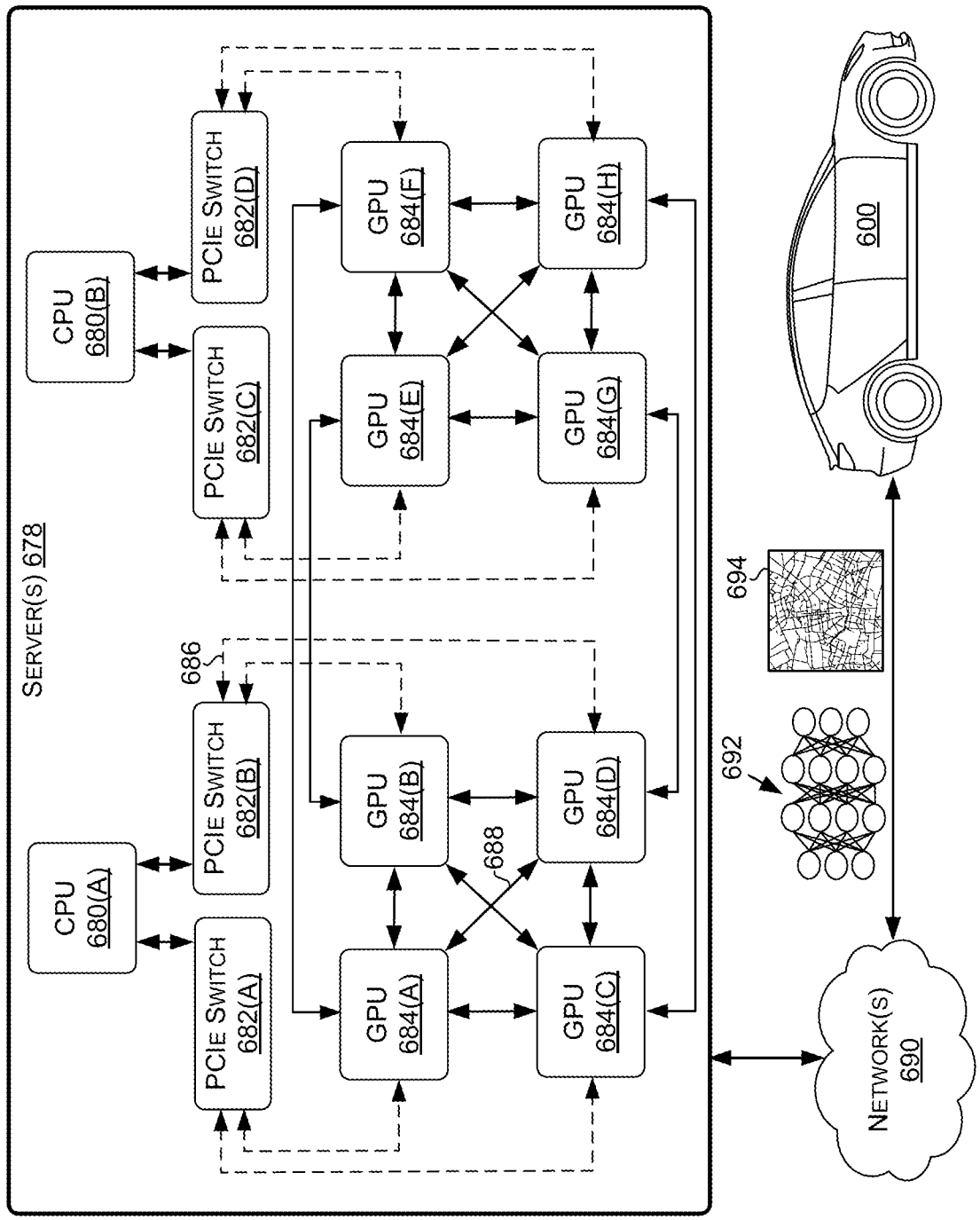
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
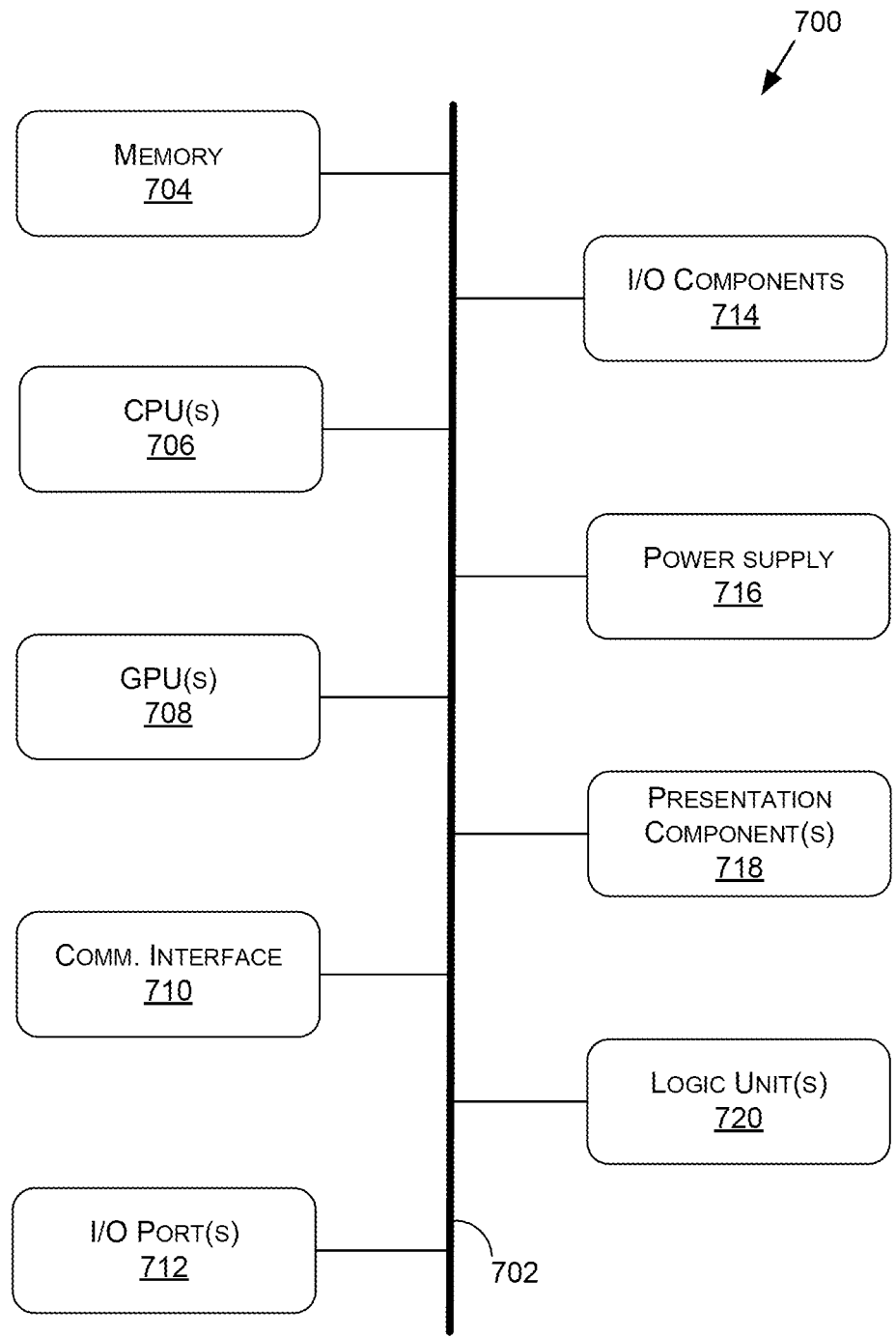
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
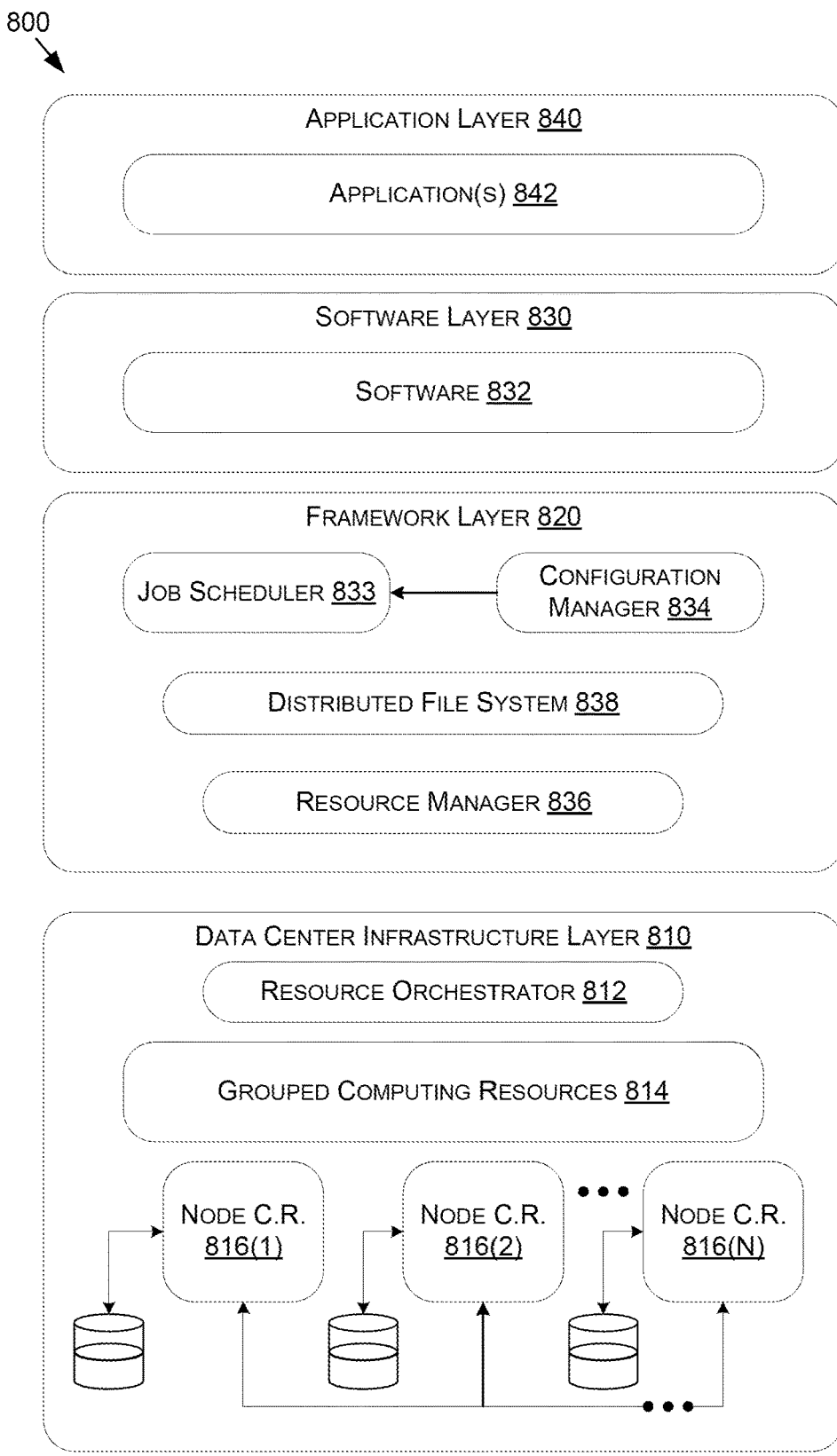
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 833, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 833 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 833. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more processing units to perform operations including:
      determining a future location of an agent in an environment using a neural network having parameters trained to predict the future location of the agent in the environment;
      determining a plurality of candidate trajectories for a machine based at least on the future location of the agent in the environment;
      computing cost values for the plurality of candidate trajectories using one or more analytical functions trained to generate predictions corresponding to the cost values using at least one input term derived from the future location, the cost values being differentiable with respect to the parameters of the neural network through the at least one input term;
      selecting a trajectory from the plurality of candidate trajectories based at least on the cost values; and
   performing one or more control operations for the machine using the trajectory.

2. The system of claim 1, wherein the operations further include:
   based at least on the cost values, computing, using the trajectory, a control sequence for the machine using one or more second analytical functions trained to generate second predictions corresponding to the control sequence, the second predictions being differentiable with respect to at least one parameter of the one or more analytical functions through at least one second input term of the one or more second analytical functions.

3. The system of claim 2, wherein the operations further include jointly training the one or more analytical functions, the one or more second analytical functions, and the neural network.

4. The system of claim 1, wherein the determining the plurality of candidate trajectories includes:
   sampling a current state of the machine in a state space and a set of terminal states for the machine to determine the plurality of candidate trajectories for the machine.

5. The system of claim 1, wherein the selecting the trajectory from the plurality of candidate trajectories includes classifying the trajectory as a target trajectory for the machine based at least on a categorical distribution corresponding to the plurality of candidate trajectories.

6. The system of claim 1, wherein the at least one input term computes a cost corresponding to the future location of the agent predicted using the neural network, the cost weighted using a corresponding weight value to compute a cost value of the cost values.

7. The system of claim 1, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

8. The system of claim 1, the determining the future location includes applying, to the neural network, one or more initial locations of the agent, the one or more initial locations determined using sensor data generated using one or more sensors associated with the machine.

9. A method comprising:
determining first predictions corresponding to one or more future states of one or more agents in an environment using at least one neural network having parameters trained to generate the first predictions;
computing one or more cost values for one or more candidate movements for a machine using one or more analytical functions having at least one input term derived from the one or more future states, the at least one input term including at least one parameter trained to generate second predictions corresponding to the one or more cost values, the one or more cost values being differentiable with respect to the parameters of the at least one neural network through that the at least one input term; and
performing one or more control operations for the machine based at least on the one or more cost values.

10. The method of claim 9, wherein the method further includes:
based at least on the one or more cost values, computing, using the one or more candidate movements, a control sequence for the machine using one or more second analytical functions trained to generate third predictions corresponding to the control sequence, the third predictions being differentiable with respect to at least one parameter of the one or more analytical functions, wherein the one or more control operations correspond to the control sequence.

11. The method of claim 9, further comprising jointly training the one or more analytical functions and the at least one neural network based at least on backpropagating gradients through the at least one input term to the parameters of the at least one neural network.

12. The method of claim 9, wherein the one or more candidate movements are determined based at least on:
sampling a current state of the machine in a state space and a set of terminal states for the machine to determine the one or more candidate movements for the machine.

13. The method of claim 9, wherein the performing the one or more control operations for the machine is based at least on:
classifying a candidate movement of the one or more candidate movements as a target candidate movement for the machine based at least on a categorical distribution corresponding to the one or more candidate movements.

14. The method of claim 9, wherein the at least one input term computes a cost corresponding to the first predictions generated using the at least one neural network.

15. The method of claim 9, wherein the at least one input term includes a Gaussian radial basis function.

16. The method of claim 9, wherein the one or more cost values are based at least on one or more of:
one or more predicted collisions between the machine and at least one agent of the one or more agents;
one or more distances between at least one state of the machine and at least one goal state for the machine;
one or more lateral lane deviation amounts;
one or more lane heading deviation amounts; or
one or more control effort amounts.

17. The method of claim 9, wherein the determining the first predictions includes applying, to the at least one neural network, one or more initial states of the one or more agents, the one or more initial states determined using sensor data generated using one or more sensors associated with the machine.

18. The method of claim 17, further including generating, using at least one second neural network, third predictions corresponding to the one or more initial states of the one or more agents in the environment.

19. A processor comprising:
one or more circuits to perform one or more control operations for a machine based at least on one or more cost values determined for one or more candidate movements for the machine,
the one or more cost values determined using one or more analytical functions trained to generate first predictions corresponding to the one or more cost values using at least one input term derived from one or more future states of one or more agents,
the first predictions being differentiable with parameters of at least one neural network used to generate second predictions corresponding to the one or more future states through the at least one input term.

20. The processor of claim 19, wherein the one or more circuits are further to:
based at least on the one or more cost values, compute, using the one or more candidate movements, a control sequence for the machine using one or more second analytical functions trained to generate third predictions corresponding to the control sequence, the third predictions being differentiable with respect to at least one parameter of the one or more analytical functions, wherein the one or more control operations correspond to the control sequence.

21. The processor of claim 19, wherein the one or more analytical functions and the at least one neural network are jointly trained.

22. The processor of claim 19, wherein the processor is comprised in at least one of:
a control system for an autonomous or semi-autonomous machine;

a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

* * * * *